US011352950B2

(12) United States Patent
Houssainy et al.

(10) Patent No.: US 11,352,950 B2
(45) Date of Patent: Jun. 7, 2022

(54) STORAGE-COMBINED COLD, HEAT AND POWER

(71) Applicant: The Regents of the University of California, Oakland, CA (US)

(72) Inventors: Sammy Houssainy, Laguna Hills, CA (US); Mohammad Janbozorgi, Los Angeles, CA (US); Walid Ismail, La Cresenta, CA (US); Hossein Pirouz Kavehpour, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 545 days.

(21) Appl. No.: 16/445,007

(22) Filed: Jun. 18, 2019

(65) Prior Publication Data
US 2019/0301749 A1    Oct. 3, 2019

Related U.S. Application Data

(63) Continuation-in-part of application No. PCT/US2018/015949, filed on Jan. 30, 2018.
(Continued)

(51) Int. Cl.
*F02C 1/05* (2006.01)
*F01K 7/16* (2006.01)
(Continued)

(52) U.S. Cl.
CPC .......... *F02C 1/05* (2013.01); *F01K 7/16* (2013.01); *F01K 13/00* (2013.01); *F01K 13/02* (2013.01);
(Continued)

(58) Field of Classification Search
CPC .......... F01K 17/02; F01K 17/025; F01K 7/16; F01K 13/00; F01K 13/02; F01K 27/00;
(Continued)

(56) References Cited

U.S. PATENT DOCUMENTS

| 4,158,145 A | 6/1979 | Kartsounes et al. |
| 5,634,340 A * | 6/1997 | Grennan .......... F02C 6/16 60/648 |

(Continued)

FOREIGN PATENT DOCUMENTS

| WO | 2016127698 A1 | 8/2016 |
| WO | 2017044658 A1 | 3/2017 |

OTHER PUBLICATIONS

International Search Report and Written Opinion dated Apr. 5, 2018, issued in corresponding International Application No. PCT/US2018/015949, filed Jan. 30, 2018, 8 pages.
(Continued)

*Primary Examiner* — Mark A Laurenzi
*Assistant Examiner* — Xiaoting Hu
(74) *Attorney, Agent, or Firm* — Christensen O'Connor Johnson Kindness PLLC (57) ABSTRACT

An energy storage-combined cooling, heating and power (S-CCHP) system for a building receives energy from a source, for example an intermittent source, and stores the energy in first and second high temperature energy storage (HTES) units. A Brayton cycle using the first HTES unit produces hot and pressurized air that is further heated in the second HTES unit. The heated air drives a turbine to generate electricity for the building. A portion of the compressed air from the Brayton cycle is diverted to a hot water heat exchanger, then to another turbine to produce electricity to the building. The hot water heat exchanger heats water for the building and the other turbine exhaust cools water for building cooling. Heat exchangers are strategically placed to optimize the thermal efficiency of the cycle. In some embodiments the heat transfer fluid is humidified to improve thermal energy transfer properties.

20 Claims, 9 Drawing Sheets

Related U.S. Application Data (60) Provisional application No. 62/452,309, filed on Jan. 30, 2017.

(51) Int. Cl.
*F01K 13/00* (2006.01)
*F01K 13/02* (2006.01)
*F01K 17/02* (2006.01)
*F02C 6/18* (2006.01)

(52) U.S. Cl.
CPC ............. *F01K 17/02* (2013.01); *F02C 6/18* (2013.01); *F05D 2220/64* (2013.01); *Y02E 20/14* (2013.01); *Y02E 60/14* (2013.01); *Y02P 80/15* (2015.11)

(58) Field of Classification Search
CPC .... F01K 27/02; F02C 1/04; F02C 1/05; F02C 1/06; F02C 6/04; F02C 6/18; F05D 2260/42; Y02E 20/14; Y02P 80/15
See application file for complete search history.

(56) References Cited

U.S. PATENT DOCUMENTS

| | | | |
|---|---|---|---|
| 2003/0049139 A1 | 3/2003 | Coney et al. | |
| 2003/0051496 A1* | 3/2003 | Fukushima | F02C 6/14 62/331 |
| 2005/0120715 A1 | 6/2005 | Labrador | |
| 2007/0234749 A1* | 10/2007 | Enis | C02F 1/22 62/401 |
| 2009/0282822 A1 | 11/2009 | McBride et al. | |
| 2012/0036853 A1* | 2/2012 | Kidd | F02C 6/18 60/659 |
| 2012/0319410 A1* | 12/2012 | Ambrosek | F02C 6/10 290/1 R |
| 2014/0070544 A1 | 3/2014 | Bronicki | |
| 2014/0102098 A1* | 4/2014 | Bowan | F01K 7/32 60/671 |
| 2014/0159371 A1* | 6/2014 | Hugo | F03D 9/28 60/659 |
| 2014/0298813 A1 | 10/2014 | Brunhuber et al. | |
| 2015/0069758 A1* | 3/2015 | Davidson | F01K 25/10 60/659 |
| 2015/0260463 A1 | 9/2015 | Laughlin et al. | |
| 2016/0047361 A1* | 2/2016 | Al-Sulaiman | F03G 6/067 60/641.15 |
| 2017/0131037 A1 | 5/2017 | Zhao et al. | |
| 2017/0350318 A1* | 12/2017 | Williams | F02C 3/04 |
| 2019/0056152 A1* | 2/2019 | Matsukuma | F02C 6/04 |

OTHER PUBLICATIONS

Extended European Search report dated Oct. 5, 2020, issued in European Application No. 18 74 4325.4, filed Jan. 30, 2018, 5 pages.

* cited by examiner

FIG. 7

STORAGE-COMBINED COLD, HEAT AND POWER

CROSS-REFERENCES TO RELATED APPLICATIONS

This application is a continuation-in-part of PCT/US2018/015949, filed Jan. 30, 2018, which claims the benefit of Provisional Application No. 62/452,309, filed Jan. 30, 2017. The entire disclosure of each application is incorporated by reference in its entirety.

BACKGROUND

Energy storage is an important technology for the future of the energy infrastructure, and it is one of the top challenges in the energy industry today. Inexpensive, large-scale, and efficient energy storage is an enabling technology for exploiting intermittent renewable energy sources such as solar energy, wind energy, etc. Improvements in energy storage systems will allow renewable energy sources to comprise a more significant fraction of the national energy grid. Energy storage can be used to smooth out fluctuations in renewable energy generation, reducing or eliminating intermittency and replacing unpredictable energy with manageable, dispatchable energy. For example, energy storage systems may convert electric energy into another mode of storable energy, such as mechanical, potential, chemical, biological, electrical, or thermal energy, and then convert the stored energy back into electric energy when the energy is deployed. Energy storage devices are generally categorized by their performance characteristics and the applications they serve.

Various technologies for energy storage are known. Energy storage devices may be used to bridge the timing gap between energy production and user energy requirements. Solutions for efficient energy storage have gained increasing interest due to the emphasis on the development of alternative energy resources, such as solar electric energy, solar thermal energy, wind energy, and the like. Such alternative energy resources often are only available intermittently. Exemplary technologies for energy storage include high power flywheels, superconducting magnetic energy storage, high-power super-capacitors, various advanced battery technologies including flow batteries, pumped-storage hydro-electricity, thermal energy storage, and compressed air energy storage. According to recent studies, compressed air energy storage holds particular promise as an economical technology for bulk energy management.

Compressed air energy storage (CAES) is known to be an effective way to store energy, but it is currently not efficient and not cost-effective. The existing state of the art of CAES is focused on advanced adiabatic methods (AA-CAES) and isothermal methods (I-CAES). However, to date such systems have not been found to provide a competitive alternative for energy storage. However, conventional CAES systems are based on storing energy at high pressure. Energy storage systems wherein the main energy storage is in the compressed air have disadvantages, including high costs associated with compressing to high pressures, energy losses associated with the compressive heating, and the cooling on expansion.

In many applications, for example, in large buildings such as commercial office buildings, manufacturing facilities, and the like, energy is required for a number of different purposes, including operating electrical equipment, providing heating and cooling of spaces, providing heated water, etc. Conventionally, these different requirements may be provided by connecting to the electrical grid and providing for the different requirements independently, or providing access to a plurality of energy sources, and again providing for the different requirements independently. Recently it has become clear that the net energy requirements of complex systems such as buildings may be more efficiently provided by taking a holistic approach to the various energy needs (e.g., electricity, heating, cooling) to optimize the overall efficiency of the system.

A holistic system is disclosed, referred to herein as storage-combined cooling, heating and power (S-CCHP), that is operable with unsteady energy sources such as solar and wind energy systems, and that provides for electrical energy, heating, and cooling in a unified system configured to optimize the utilization of the available energy.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An energy system including energy storage, and combined cooling, heating, and power is configured to work with a source of energy, for example, electric energy. The system is particularly suited for use with intermittent energy sources, for example, solar-electric sources, solar-thermal, tidal sources, and the like. The system includes two high temperature energy storage (HTES) units, each defining a heat transfer flow path therethrough. The HTES units receive energy from a source and store the energy as thermal energy, and transfer the energy to fluid flowing through the flow paths. A first air compressor is connected to a second air compressor, for example, to form a two-stage compressor. The first compressor generates a stream of compressed air to an outlet. A first flow junction connected to the outlet directs a first portion of the compressed air stream to a hot fluid heat exchanger and a second portion of the compressed stream to the second compressor. The second compressor further compresses the second portion of the air stream. A first recuperator receives the second portion of the stream from the second compressor and directs it to the first HTES unit. An outlet of the first HTES unit heat transfer flow path is fluidly connected to the turbine. An outlet of the turbine is fluidly connected to a second recuperator that directs the second portion of the stream to the second HTES unit heat transfer flow path. A first power turbine receives the second portion of the stream from the second HTES unit heat transfer flow path, and an outlet of the first power turbine is fluidly connected to the second recuperator. The first power turbine is drivably connected to a first generator that provides electrical energy to the building. A flow conduit from the second recuperator directs a first part of the second portion of the flow to the first recuperator and a second part of the second portion of the stream to a third recuperator. A second power turbine receives the first portion of the stream from the hot fluid heat exchanger, and the second power turbine is drivably connected to a second power generator that is configured to provide electrical energy to the building. A cold fluid heat exchanger receives the first portion of the stream from the second power turbine, and the third recuperator receives the first portion of the stream from the cold fluid heat exchanger and the second recuperator receives the second portion of the stream from the third recuperator. A first fluid flow path cycles a first heat transfer fluid from the building, through the cold fluid heat exchanger, and back to the building. A second fluid flow path cycles a second heat transfer fluid from the building, through the hot fluid heat exchanger, and back to the building.

In an embodiment the source of energy is an intermittent source of electric energy.

In an embodiment the source of energy is one of a photovoltaic farm and a solar-thermal farm.

In an embodiment the first HTES unit is a block of high-temperature, high-heat capacity material comprising a material having a specific heat capacity greater than 800 J/g° C. at 25° C. that retains its strength at temperatures of at least 1,000° C.

In an embodiment the first HTES unit is a block of at least one of a refractory, a high-temperature cement, and a ceramic composite.

In an embodiment the first HTES unit is a block of a ceramic or refractory material having a plurality of cartridge heaters disposed in the block of material and a flow path extending through the block of material.

In an embodiment the first HTES unit is at least one block of material having a plurality of air channels therethrough with an inlet manifold at an inlet to the plurality of channels and an outlet manifold at an outlet to the plurality of channels.

In an embodiment the at least one block of material is a plurality of blocks of material aligned in series wherein the inlet manifold engages a first one of the plurality of blocks of material and the outlet manifold engages a last one of the plurality of blocks of material.

In an embodiment the blocks of material are spaced apart defining a space between adjacent blocks.

In an embodiment a first low-energy heat exchanger is fluidly connected to the first recuperator and further includes a third fluid flow path configured to cycle the second heat transfer fluid from the building, through the first low-energy heat exchanger, and back to the building.

In an embodiment the first and second heat transfer fluids comprise water.

A method of providing a heated fluid, a cooled fluid, and electricity to a building includes receiving energy from an intermittent energy source, and storing the energy in a first high temperature energy storage HTES unit and in a second HTES unit. A first air stream comprising a compressively heated air stream and a second air stream comprising a turbine exhaust stream is generated in a Brayton cycle using energy from the first HTES unit and a first compressor, a second compressor, and a turbine. The first air stream is directed sequentially (i) through a hot water heat exchanger; then (ii) through a first power turbine configured to drive a first generator; then (iii) through a cold water heat exchanger, then (iv) through the second HTES unit. The first generator provides electricity to the building. The second air stream is directed through the second HTES unit, wherein the first and second air streams are heated in the second HTES unit. The heated first and second air streams are directed to a second power turbine configured to drive a generator, wherein the generator provides electricity to the building. A cold fluid stream is generated for the building by cycling a first heat transfer fluid from the building, through the cold water heat exchanger, and back to the building. A hot fluid stream is generated for the building by cycling a second heat transfer fluid from the building, through the hot water heat exchanger, and back to the building.

In an embodiment the intermittent power source is one of a photovoltaic farm and a solar-thermal farm.

In an embodiment the first HTES unit is a block of high-temperature, high-heat capacity material comprising a material having a specific heat capacity greater than 800 J/g° C. at 25° C. that retains its strength at temperatures of at least 1,000° C.

In an embodiment the first HTES unit is a block of at least one of a refractory, a high-temperature cement, and a ceramic composite.

In an embodiment the first HTES unit is a block of a ceramic or refractory material having a plurality of cartridge heaters disposed in the block of material, and a flow path extending through the block of material.

In an embodiment the first HTES unit is at least one block of material having a plurality of air channels therethrough with an inlet manifold at an inlet to the plurality of channels and an outlet manifold at an outlet to the plurality of channels.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
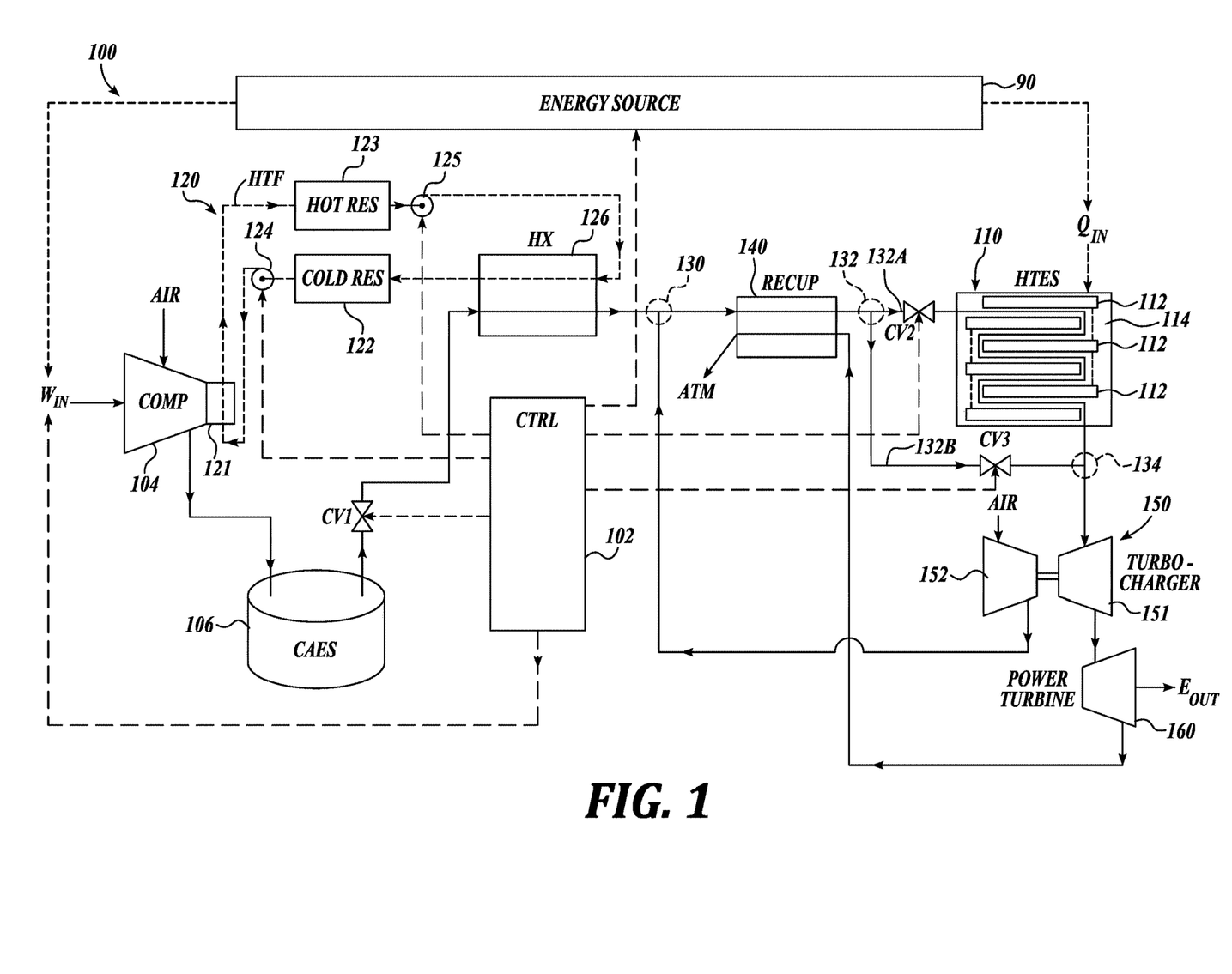
FIG. 1 is a diagram of a first embodiment of a novel low-cost hybrid energy storage system (LCHESS)

Exemplary low-cost hybrid energy storage systems (LCHESS) in accordance with the present invention will now be described with reference to the figures, wherein like numbers indicate like elements. A first LCHESS system 100 in accordance with the present invention is illustrated in FIG. 1. The LCHESS system 100 is configured to temporarily store energy, and to make available or deploy the stored energy for later use. As discussed above, efficient and low-cost energy storage is an important challenge in the energy industry, particularly for energy systems that incorporate intermittent energy sources. In an exemplary application, the LCHESS system 100 may store excess energy when generating capacity exceeds demand, and distribute the stored energy when the demand exceeds the generating capacity. In grid energy storage applications the LCHESS system 100 is suitable for load leveling applications. The LCHESS system 100 also allows providers that have multiple and varied energy-generating systems, to optimize the operation of lower-cost energy generating systems, storing excess energy generation from the lower-cost energy production systems during low demand periods, and deploying the stored energy during peak demand periods, thereby reducing the reliance on more expensive energy generating systems.

The LCHESS system 100 will also find applications in off-grid, stand-alone energy generation applications. For example, LCHESS system 100 may provide energy storage for remote energy generation systems that rely on intermittent energy sources, such as solar energy, wind energy, tidal energy, or the like, to provide energy when the intermittent source is not available.

For example, in the LCHESS system 100 shown in FIG. 1, one or more energy sources 90 provide energy to the system 100 using a controller 102 (air flows are indicated by solid lines, control signals are indicated by long-dashed lines, and non-air and electric energy transfer flows are indicated by short-dashed lines). The controller 102 may be any suitable control device or system, as are well known in the art, including programmable systems, general purpose systems, custom-designed controllers, and the like. The controller 102 may communicate with the various sensors and components with wired connections, wirelessly, or with a combination of wired and wireless communications. The controller 102 will preferably include sensors to monitor the status of the system, including for example, pressure sensors, temperature sensors, position sensors, current/voltage sensors, and the like, as are known in the art.

The energy source 90 may be any suitable combination of sources of energy, including, for example, one or more renewable energy sources. In some embodiments the LCHESS system 100 may be integrated into an energy grid, and obtain energy directly from the grid. The LCHESS system 100 provides two primary modes of energy storage, compressed air energy storage in a (CAES) reservoir 106, and high-temperature thermal energy storage (HTES) in an HTES system 110.

When excess energy from the source 90 is available, the controller 102 may direct excess energy $W_{IN}$ to operate a compressor 104 to compress air and to store the compressed air in the CAES reservoir 106. Because the LCHESS system 100 does not rely solely on the stored air for energy deployment, the system 100 may be designed to store compressed air in the CAES reservoir 106 at relatively low pressures, compared to prior art systems. It is contemplated that the compressor 104 and CAES reservoir 106 may provide air storage in the CAES reservoir 106 at pressures less than 1,000 psi, for example, or at pressures of less than 750 psi in another example. It will be appreciated by persons of skill in the art that lower pressure CAES greatly reduces the costs associated with both the CAES reservoir 106 and the compressor 104. In addition, the lower pressure mitigates inefficiencies and losses related to the high temperatures typically associated with high compression pressures, and the low temperatures typically associated with expanding gasses from high pressures.

Compressing air raises the temperature of the air. In addition, the compressor 104 generates heat during the compression process. The LCHESS system 100 shown in FIG. 1 includes a low-temperature thermal energy storage system (LTES) in a heat recovery loop 120. The heat recovery loop 120 extracts thermal energy from the compressed air. By extracting thermal energy from the compressed air, the air stored in the CAES reservoir 106 is relatively cooler (i.e., cooled by the extraction of thermal energy) allowing more air mass to be stored in the CAES reservoir 106 at a given pressure.

The LTES heat recovery loop 120 includes a compressor heat recovery system, for example, as a compressor heat exchanger 121 for extracting heat at the compressor 104 (either directly from the compressed air or from lubrication oil from the compressor), a cold fluid reservoir 122, a hot fluid reservoir 123, and a first fluid (air or gas) pump 124. During operation of the air compressor 104, the controller 102 activates the first pump 124 in the LTES heat recovery loop 120. The first pump 124 flows a heat transfer fluid (or working fluid) from the cold fluid reservoir 122, through the compressor heat exchanger 121, and to the hot fluid reservoir 123. The heat transfer fluid extracts thermal energy from the compressed air. The relatively hot heat transfer fluid is stored in the hot fluid reservoir 123, and the relatively cool compressed air is stored in the CAES reservoir 106. The energy stored in the heat transfer fluid is usefully recovered during energy deployment, as discussed below.

In addition (or alternatively if the CAES reservoir 106 is sufficiently pressurized), when excess energy is available the controller 102 may initiate storage of excess energy $Q_{IN}$ in the HTES unit 110. The HTES unit 110 includes a thermal energy storage material 114 that is stable at high temperatures and has a high heat capacity for storing thermal energy in the form of sensable heat. A high-temperature, high-heat capacity (HTHHC) material is herein expressly defined to be a solid phase material having a specific heat capacity greater than 800 J/g° C. at 25° C. and that retains its strength at temperatures of at least 1,000° C.

Exemplary HTHHC materials 114 include refractories, high-temperature cements or concretes, stone, brick, sand, and certain ceramic composites. For example, the HTHHC material 114 may be formed as a solid block or may be a containerized volume of loosely packed smaller pellets or particles. If smaller pellets or particles are selected, the HTHHC material 114 may be operated as a fluidized bed.

The HTES system 110 in a current embodiment includes electric cartridge heating units 112 embedded or inserted into the HTHHC material 114.

Figure 2A:
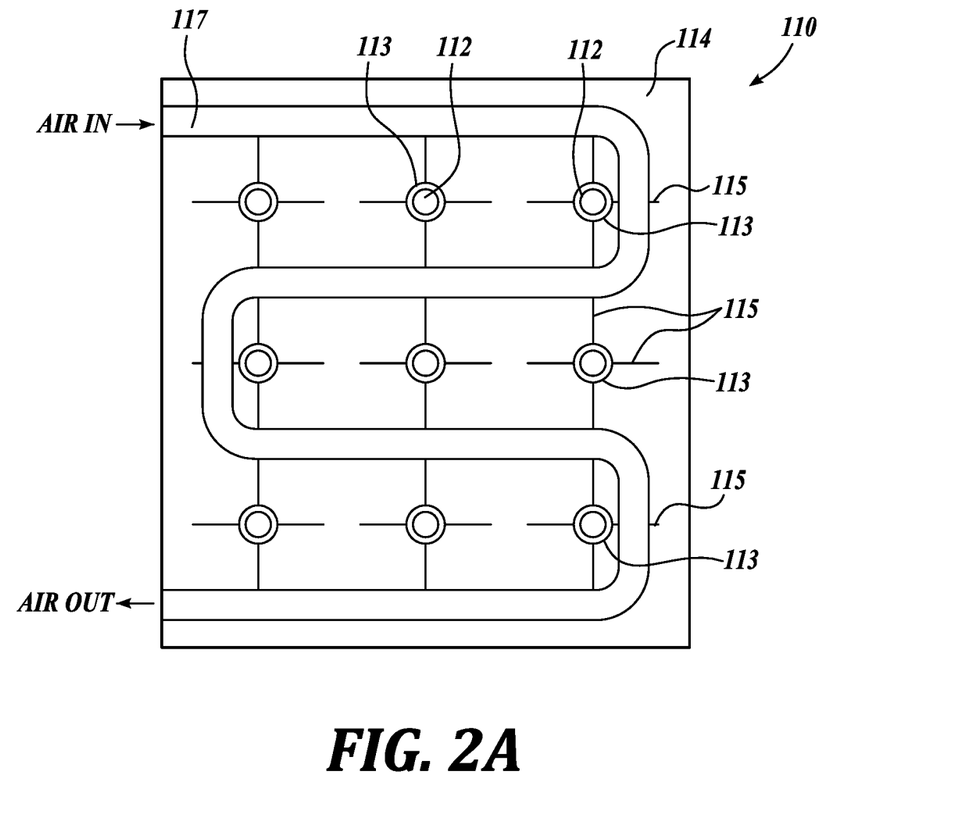
FIG. 2A shows a cross-section of one embodiment of the high-temperature thermal energy storage system for the LCHESS shown in FIG. 1.

In an embodiment shown in cross-section in FIG. 2A, the HTES system 110 includes a block of HTHHC material 114 with channels 113 configured to receive heating units 112, for example cartridge heaters. In some embodiments the channels 113 are formed directly in the block of HTHHC material 114. In other embodiments the channels are formed from tubes in the HTHHC material 114. For example, stainless steel tubes may be embedded in the block of HTHHC material 114. The channels 113 may further comprise exterior fins or extensions 115 having high thermal conductivity, to facilitate transferring heat into the HTHHC material 114.

One or more air channels 117 (one shown), with corresponding air inlets and outlets, extend through the block of HTHHC material 114, such that air flowing through the channels 117 is heated when the HTHHC material 114 is hot. Although a serpentine air channel 117 is illustrated, it is contemplated that a plurality of through air channels may alternatively be used, and may be preferable in some applications, for example, to provide sufficient air flow with reduced pressure losses.

Figure 2B:
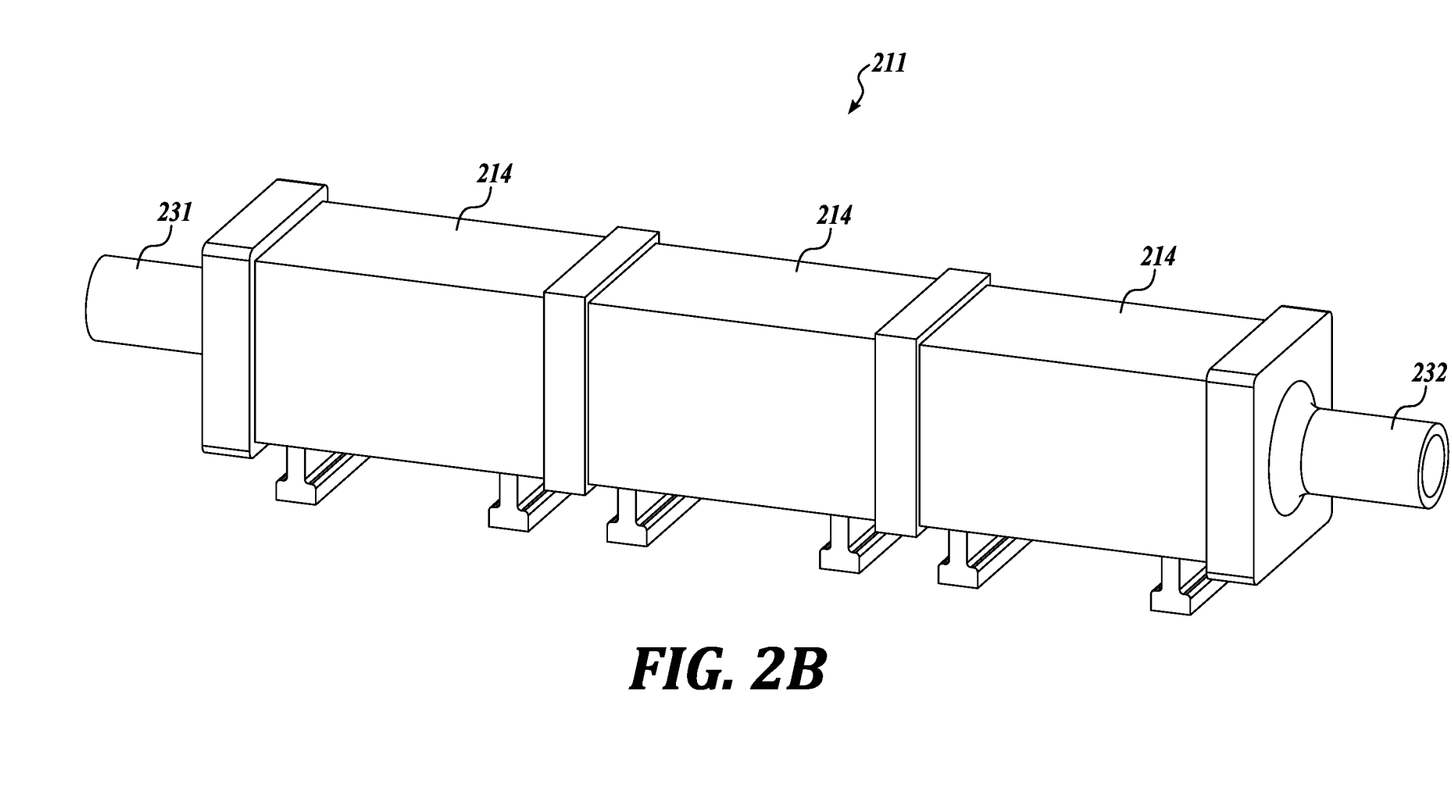
FIG. 2B shows a second embodiment of a high-temperature thermal energy storage system for the LCHESS shown in FIG. 1.
Figure 2C:
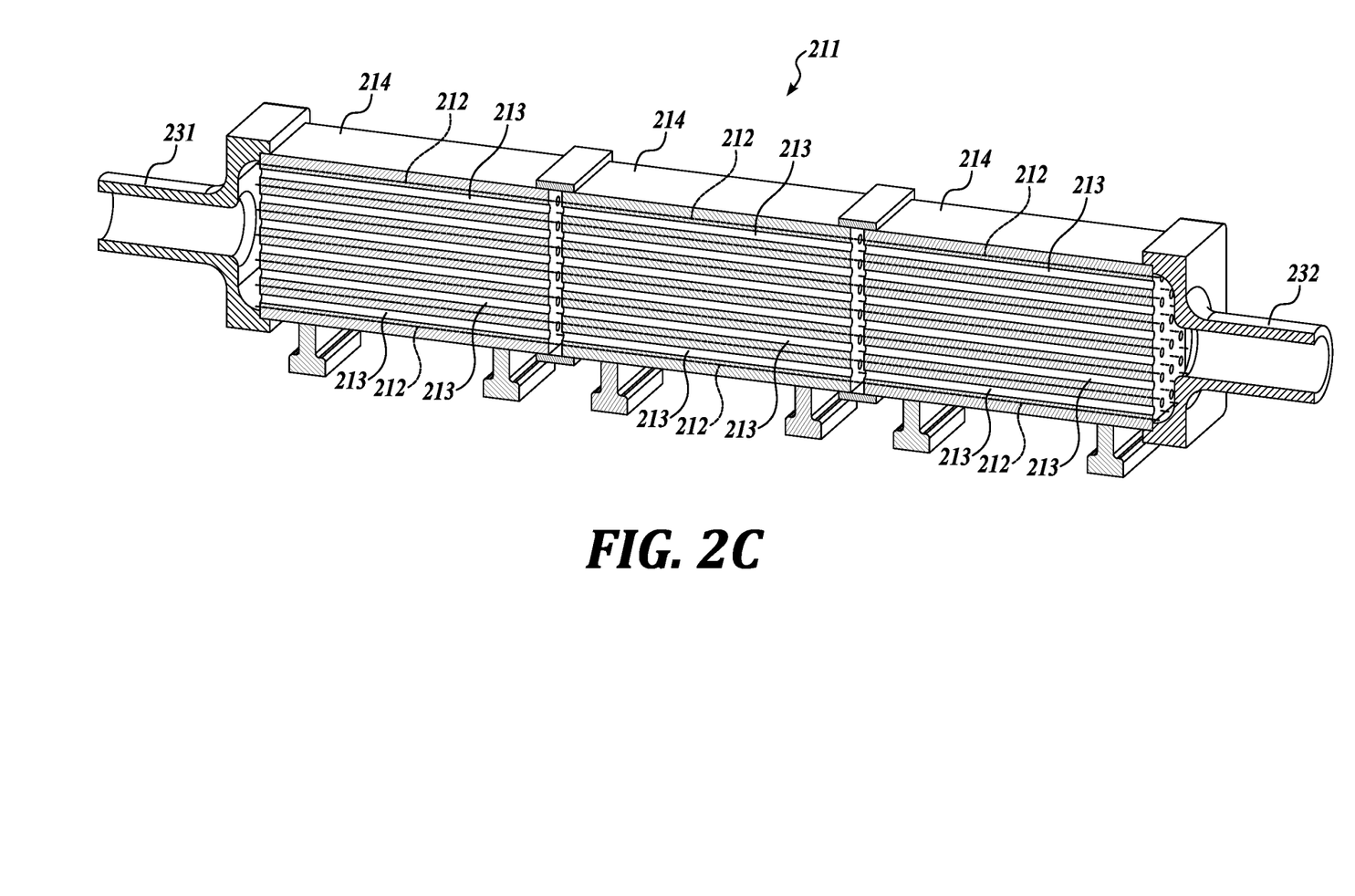
FIG. 2C shows a cross-sectional view of the high-temperature thermal energy storage system shown in FIG. 2B.

FIG. 2B illustrates another embodiment of a modular HTES system 211 having a plurality of blocks of HTHHC material 214 (three shown), assembled in series. FIG. 2C shows the HTES system 211 in cross-section. Each of the blocks of HTHHC material 214 have a plurality of air channels 213 therethrough, with an inlet manifold 231 on one end, and an outlet manifold 232 on an opposite end, wherein air flows through the plurality of blocks 214 in the HTES system 211, essentially in parallel channels 213. In this embodiment the blocks of material 214 are spaced apart, defining a mixing plenum therebetween. In an embodiment a plurality of lengths of resistance ribbons or wires 212, for example, iron-chromium-aluminum alloy ribbon or wire such as that sold under the trademark KANTHAL®, are embedded or inserted into the HTHHC material 214. In an embodiment the ribbons or wires 212 have a temperature rating of about 2,550° F. The ribbons or wires 212 are connected to an electric energy source $Q_{IN}$ (connection not shown) to heat the HTHHC material 214.

In some embodiments the HTES system 110 may comprise a plurality of modular heat transfer units that are connected in parallel or in series, such that the system is readily expandable. It is contemplated in some embodiments that a plurality of HTES systems 110 may be arranged to be selectively and controllably engaged to meet particular demands. It is also contemplated, for example, that the system 100 may be modularly expanded to add additional HTES systems 110 to meet growth requirements.

The excess energy $Q_{IN}$ is directed to the heating units 112 to store the excess energy as thermal energy in the HTES system 110. In a particular embodiment the plurality of heating units 112 are cartridge heaters with power ratings of 3,000 to 5,000 W or greater. Other heating units or different wattages, and more or fewer heating units 112 may alternatively be used. The heating units 112 may be separately controllable, such that the operation of the heating units 112 can be optimized. Thermocouples may be used to monitor the temperature of the HTHHC material 114 and the resulting signals sent to, and used by, the controller 102 to control the operation of the heating units 112 to reach a desired temperature. In some embodiments the heating units 112 may be embedded directly in the HTHHC material 114.

In other embodiments, for example in solar central receiver systems, the excess energy to be stored in the HTES system 110 may be in the form of thermal energy in a heat transfer fluid. It these embodiments the heat transfer fluid may be flowed through the channels 113 in the HTHHC material 114 to store the thermal energy in the block material 114.

To deploy stored energy from the system 100, the controller 102 activates a control valve CV1 on the CAES reservoir 106 to initiate a flow from the CAES reservoir 106. The temperature of the air will drop significantly during expansion. As discussed above, when the CAES reservoir 106 is being pressurized, thermal energy from the air is extracted and stored in a hot fluid reservoir 123 using the LTES compression heat recovery loop 120. During energy deployment the controller 102 activates a second pump 125 in the heat recovery loop 120. The second pump 125 flows relatively hot heat transfer fluid from the hot fluid reservoir 123 through a second heat exchanger 126 to preheat the expansion air from the CAES reservoir 106. The heat transfer fluid then returns from the CAES tank 106 to the cold fluid reservoir 122.

The preheated air flow from the second heat exchanger 126 is then augmented with a hot and pressurized auxiliary air flow at a flow junction 130. The augmented or combined air flow is further preheated from the exhaust flow from a power turbine 160 in a recuperator is transmitted to a first turbine. The sources of the auxiliary air flow and power turbine exhaust flow is shown in FIG. 1, and discussed below. As used herein, "turbine" is expressly defined to include any fluid expander and is not intended to be restricted to axial expanders. For example, turbine, as used herein, is defined to include reciprocating piston expanders.

The combined air flow then passes into a splitter or second flow junction 132. At least a portion of the combined air flow proceeds through a first outflow line 132A from the flow junction 132, through a second control valve CV2, and into the HTES system 110, wherein the air flow is further heated. The remaining portion of the combined air flow (if any) flows through a second outflow line 132B from the second junction 132 and through a third control valve CV3, bypassing the HTES system 110. The HTES system 110 outflow and the bypass flow are recombined at flow junction 134.

The recombined outflow from flow junction 134 is directed to a turbine component 151 of a turbocharger 150. The turbine 151 drives a compressor 152 that compresses atmospheric air to produce the compression-heated auxiliary flow discussed above, which augments the air flow from the second heat exchanger 126. The auxiliary flow is directed from the compressor 152 into the first flow junction 130.

It will be appreciated that the controller 102 adjusts the control valves CV2 and CV3 to produce a desired flow split between the air flow through the HTES system 110 and the air flow bypassing the HTES system 110, to control the air inlet temperature to the turbocharger 150. Temperature sensors, pressure sensors, flow sensors, and the like (not shown) are provided in signal communication with the controller 102. The controller 102 uses the sensor data to control the valves, heating elements, and other components.

For example, when deployment of energy from the system 100 is first initiated, the HTES system 110 may be at a peak design temperature, which may be much higher than the desired air flow temperature for the turbocharger 150. To produce the desired air flow temperature, a portion of the air stream bypasses the HTES system 110, and rejoins the outflow from the HTES system 110. As the air flow continues to extract heat from the HTES system 110, the HTES system 110 temperature will decrease, and the flow split between the HTES system 110 and the bypass may be adjusted to achieve the desired temperature to the turbocharger 150. The controller 102 is configured to monitor the air flow temperatures, and to control the control valves CV2 and CV3 to produce the desired flow temperature.

The exhaust from the turbocharger turbine 151 is directed to the power turbine 160 to generate the desired deployed energy $E_{OUT}$. Exhaust from the power turbine 160 is directed to the recuperator 140, as discussed above, preheating the combined flow upstream of the HTES system 110. The turbine exhaust in this embodiment is then released to the atmosphere. Optionally, the exhaust, if sufficiently energetic, may be further utilized, for example using additional recuperators.

Figure 3:
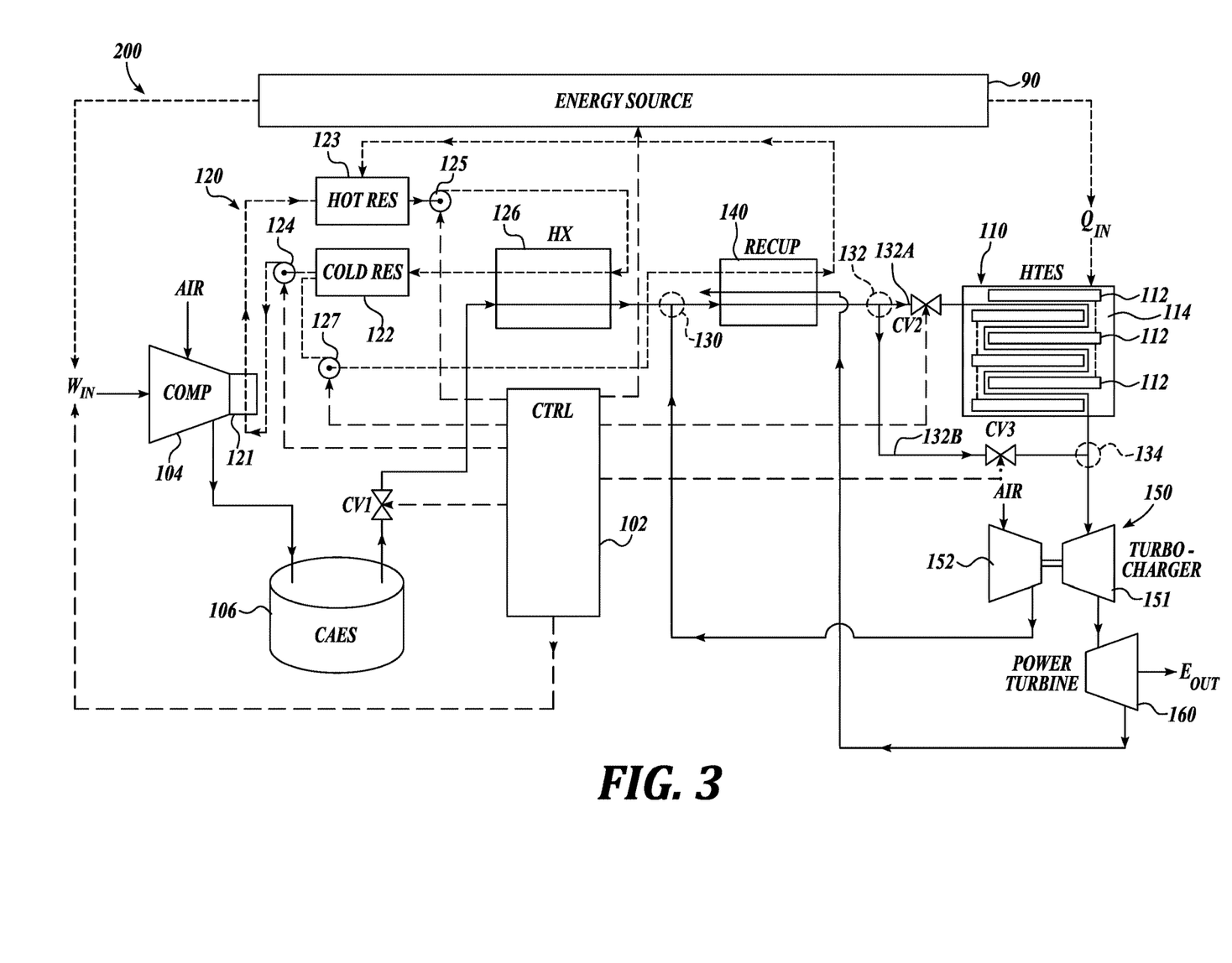
FIG. 3 is a diagram of another embodiment of a novel LCHESS wherein additional heat is recovered from the power turbine exhaust stream.

A second embodiment of an LCHESS system 200 in accordance with the present invention is shown diagrammatically in FIG. 3. This embodiment is similar to the LCHESS system shown in FIG. 1. For brevity and clarity, aspects of the LCHESS system 200 already described above will not be repeated.

In this embodiment the heat recovery loop 120 is augmented with a separate circuit to recover thermal energy from the power turbine 160 exhaust stream into the hot fluid reservoir 123. When the power turbine 160 is operating, for example, a third pump 127 is controllably configured to pump heat transfer fluid from the cold fluid reservoir 122, through the recuperator 140, and to the hot fluid reservoir 123.

Figure 4:
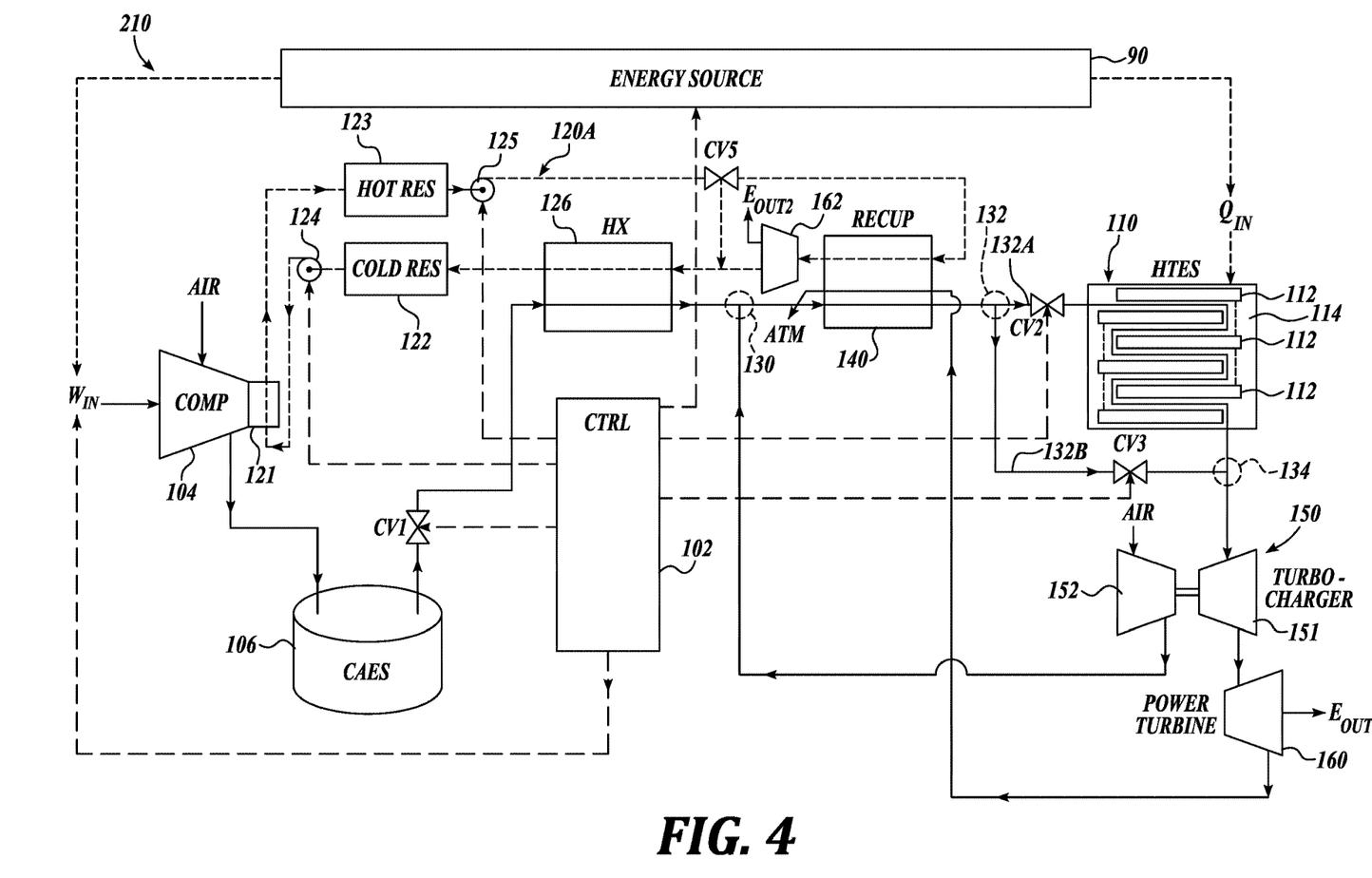
FIG. 4 is a diagram of another embodiment of a novel LCHESS further comprising a secondary energy output.

A third embodiment of an LCHESS system 210 in accordance with the present invention is shown diagrammatically in FIG. 4. This embodiment is similar to the LCHESS system 100 shown in FIG. 1. The LTES compression heat recovery loop 120A is modified to recover additional output energy $E_{OUT2}$ from the power turbine 160 exhaust. When the power turbine 160 exhaust contains sufficient thermal energy to produce a phase change in the heat transfer fluid, the second pump 125 pumps heat transfer fluid from the hot fluid reservoir 123 through the recuperator 140, where the heat transfer fluid is further heated. The vaporized fluid may then be expanded through an auxiliary turbine 162 to produce additional output energy $E_{OUT2}$. The heat transfer fluid then proceeds through the second heat exchanger 126 to preheat the expansion air from the CAES system 106, as described above, and returns to the cold fluid reservoir 122. Alternatively, for example, if the power turbine exhaust does not retain sufficient residual energy, the control valve CV5 is controlled to bypass the recuperator 140, and operates similar to the LCHESS system 100 shown in FIG. 1.

Figure 5:
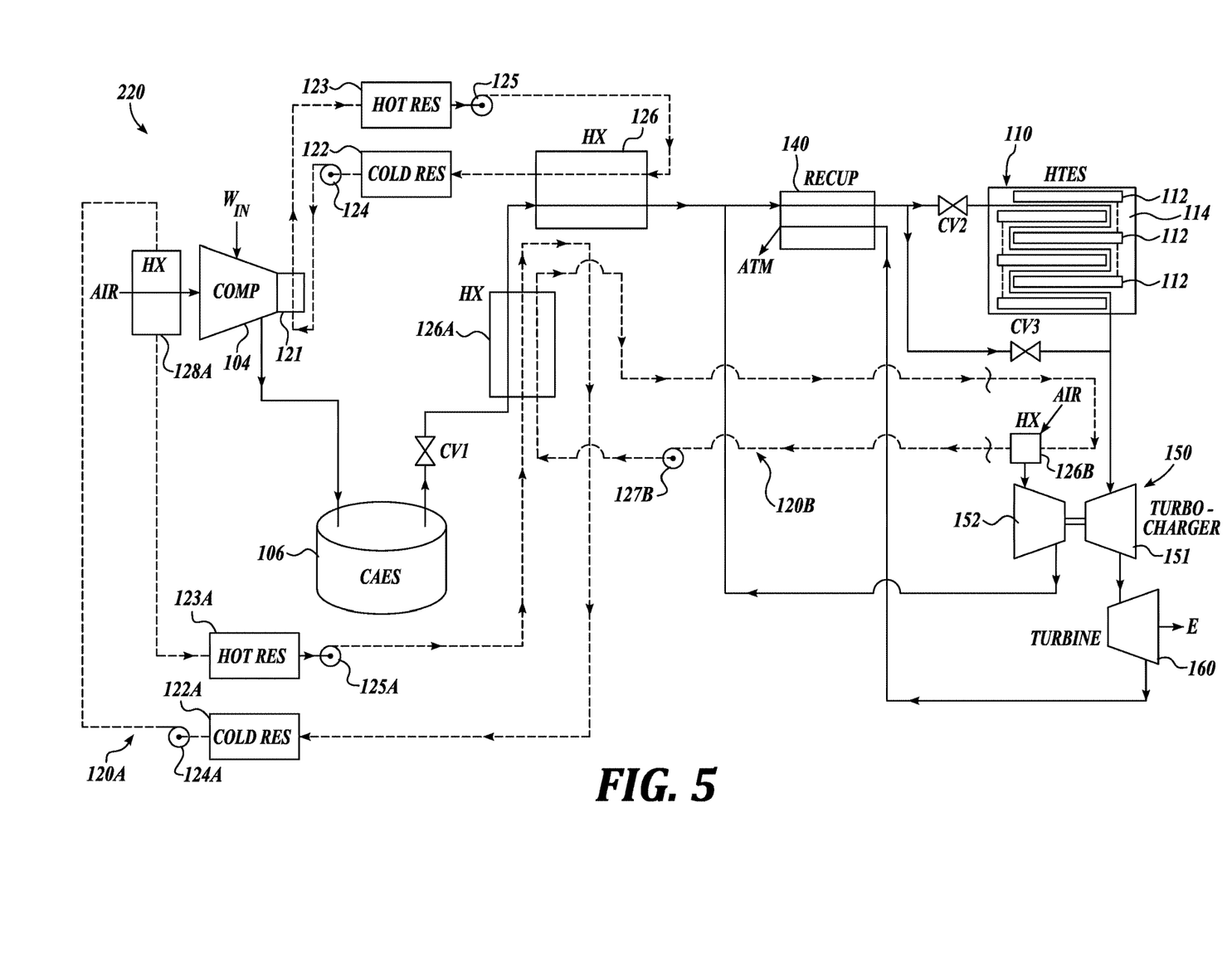
FIG. 5 is a diagram of another embodiment of a novel LCHESS further comprising a compressor inlet air cooling component.

Another embodiment of an LCHESS system 220 in accordance with the present invention is shown in FIG. 5, wherein the control system and energy source are omitted for clarity. This embodiment is similar to the embodiment shown in FIG. 1, and further includes a compressor air inlet cooling loop 120A.

The air inlet cooling loop 120A includes an upstream heat exchanger 126A that provides an initial preheating of the cold air discharged from the CAES tank 106 during energy generation. When air is released through control valve CV1, pump 125A pumps a heat transfer fluid from a warm fluid reservoir 123A, through the upstream heat exchanger 126A, and to a cold fluid reservoir 122A. The cold fluid reservoir 122A, cooled due to the expansion of air from the CAES tank 106, may be at ambient temperature, or cooler. When the compressor 104 is operating to supply compressed air to the CAES tank 106, a pump 124A pumps heat transfer fluid from the cold fluid reservoir 122A, through a compressor inlet heat exchanger 128A, and to the warm fluid reservoir 123A. The air provided to the compressor 104 is thereby cooled prior to compression, which reduces the work required by the compressor 104, improving the efficiency of the system 220. The air inlet cooling loop 120A also provides an initial preheating of the expansion air from the CAES tank 106.

Optionally, a second compressor air inlet cooling loop 120B with a pump 127B and inlet heat exchanger 126B may similarly be provided to precool air entering the compressor 152 of the turbocharger 150.

Increasing the presence of solar power is challenging. The mismatch between production and the user demand throughout the day can diminish the economic value of solar power making it less competitive compared to fossil fuels. To ensure photovoltaic (PV) technologies transform into viable energy production sources, energy solutions must deliver a regular energy supply that is adjustable to consumption needs, and the cost of the technology must be scalable to compete with conventional fossil fuels. The gap between generation and production has led to the emergence of energy storage as a crucial element in the management of energy and is one of the main focuses of the energy industry today. Of the various forms of energy storage, compressed air energy storage is a promising energy storage method due to its high reliability, scalability, economic feasibility, and low environmental impact.

A novel high temperature hybrid compressed air energy storage system (HTH-CAES) was developed, in which the combustion components are eliminated and replaced with an HTES system. In the HTH-CAES system a portion of the electrical energy from a solar power farm is used to operate a compressor, and the remainder is converted and stored as high-temperature sensable heat in a storage medium. This configuration allows for very high temperatures, enabling correspondingly higher overall efficiencies to be reached and most importantly resulting in a zero emissions process. The HTES unit takes advantage of the high thermal capacity of an inexpensive thermal medium to store heat that will later be used to superheat the compressed air. HTH-CAES allows for the addition of solar PV power directly to the HTES through thermoelectric heaters to achieve temperatures higher than traditional CAES, paving the way for a new class of energy storage systems. With the addition of a HTES unit, the workload is shifted from pure compression to investing partially in thermal storage. This separation of energy storage between compressed air and thermal storage has the effect of expanding the energy capacity of the compressed air system without the need to increase the air pressure or cavern capacity. HTES allows the system to be dynamically scaled up or down as the load leveling demand changes without any structural change in system configuration.

Figure 6:
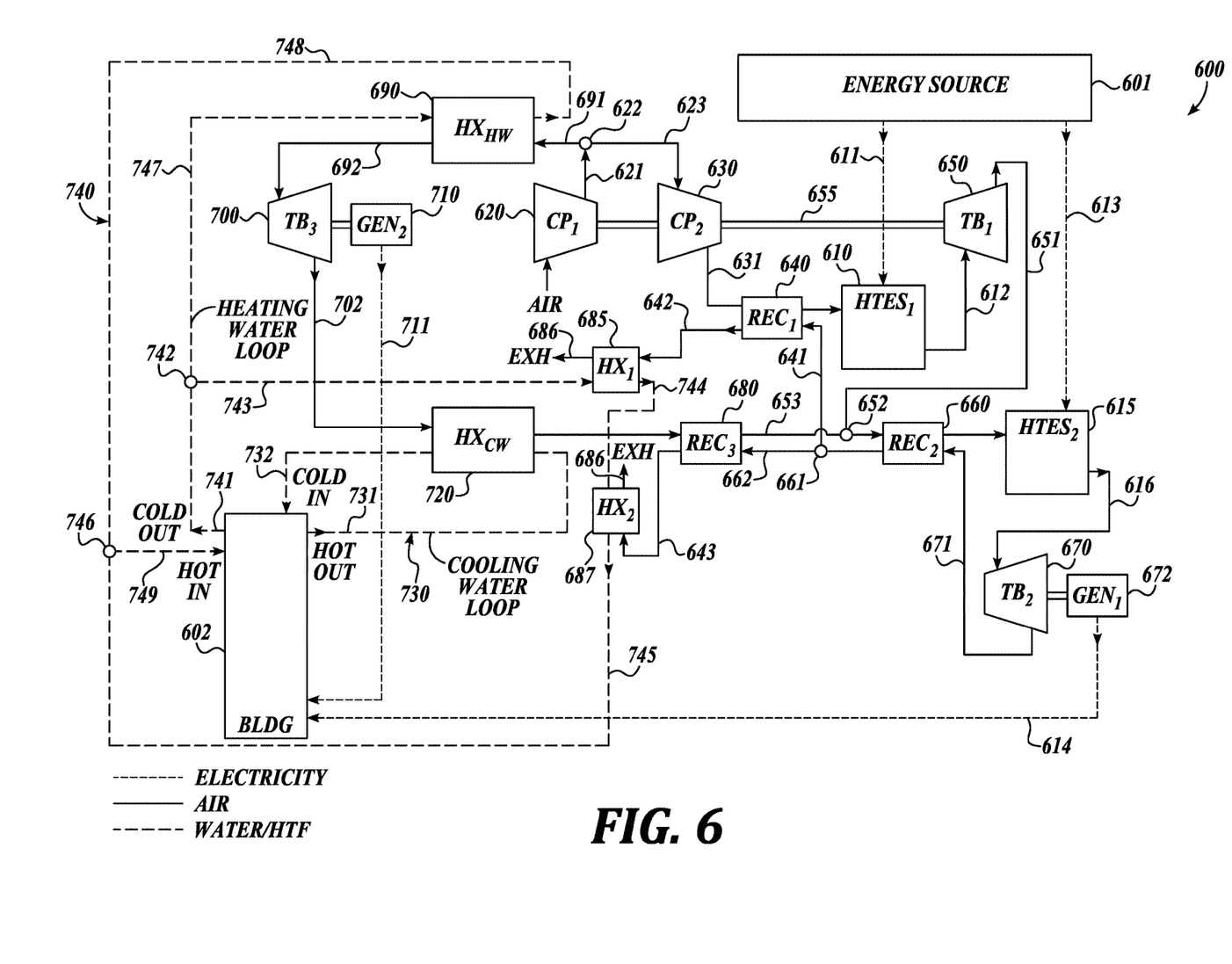
FIG. 6 shows an LCHESS system for building-scale applications in accordance with the present invention and comprising a Storage-Combined Cooling, Heating and Power (S-CCHP) cycle.

For building-scale applications, in most applications a small footprint is imperative. An extension of the HTH-CAES system discussed above, but excluding an air storage component is referred to herein as the Storage-Combined Cooling, Heating and Power (S-CCHP) system. An exemplary embodiment of an S-CCHP system 600 is shown in FIG. 6. The S-CCHP system 600 provides a relatively small footprint while using HTES technology and novel energy recovery elements to provide improved efficiencies. A novel aspect of the S-CCHP system 600 shown in FIG. 6 is the production of intermittent electrical energy through a PV system 601, and storing the produced electrical energy in the form of high-temperature thermal energy in an inexpensive solid storage media, wherein the stored thermal energy is converted, as needed, to produce electrical energy, heat in a heat transfer fluid such as water, and cooling in the heat transfer fluid. The production of hot and cold fluids, in addition to electricity provides opportunities to improve the overall efficiency of the system 600.

Referring still to FIG. 6, the input power in this embodiment is provided by a PV receiver farm 601. PV sources provide power on a diurnal cycle, wherein no power is produced during the night. It is contemplated that the system 600 may alternatively be used with other intermittent electrical power sources, for example, wind power systems, wave and/or tidal power systems, and the like. In other applications the system 600 may be connected to work from a relatively steady source, such as grid power. For example, in some applications the system may store grid energy available during off-peak hours for use when grid energy is in peak demand. With modifications that would be apparent to persons of skill in the art, the system may alternatively or additionally use one or more thermal energy sources, including natural sources such as geothermal energy, or constructed sources, for example solar thermal power systems.

To facilitate understanding of the innovative aspects of the system, the control system and components well-known in the art such as pumps, control valves, microcontrollers, and the like, are not shown. For example, a control system similar to the control system 102 described above, may be a programmable system and may communicate with sensors (not shown) that monitor the status of the system, including for example, pressure sensors, temperature sensors, position sensors, current/voltage sensors, and the like, and uses the received sensor data to control the system 600 components.

In this embodiment the S-CCHP system 600 is sized and configured to provide the electrical needs of a building 602, and simultaneously provide hot heat transfer fluid for heating the building 602, and/or cold heat transfer fluid for cooling the building 602. As used herein "building" is defined to include any structure or application that is a consumer of electrical energy, cooling and heating. In particular, the system is configured to achieve a very high thermal efficiency from the energy received from the PV farm 601 by combining the generation of electricity, heating media, and cooling media.

The S-CCHP system 600 receives electrical energy from the PV farm 601 into at least two high temperature energy storage (HTES) units, first HTES unit 610 and second HTES unit 615 through electric lines 611, 613 respectively. For example, the HTES units 610, 615 may correspond to the HTES system 110 shown in FIG. 2A, or the HTES system 211 shown in FIGS. 2B and 2C.

In an embodiment, the split in the energy transfer from the PV farm 601 to each HTES 610, 615 is actively controlled to optimize the system 600 performance. Typically the system 600 will be optimized to maximize the thermal efficiency that is consistent with providing for the energy needs of the building 602. It is contemplated that energy produced by the PV farm 601 that exceeds the needs of the building 602 may be stored in additional HTES units and/or sold or otherwise provided to the grid.

A first compressor 620 is configured to receive and compress (and compressively heat) air. The heated and compressed air exits through fluid line 621 and flows through junction 622, wherein junctions as used herein contemplate, for example, a controllable valve as are known in the art. A portion of the compressed air exits the junction 622 and enters a second compressor 630 (fluid line 623), wherein the air is further compressed (and compressively heated). It will be appreciated that the first compressor 620 and the second compressor 630 may comprise two compressor stages of a single compressor assembly. The further compressed air flows through fluid line 631 into a first recuperator 640 where it is further heated by a hot air flow from fluid line 641, before entering the first HTES unit 610. The air entering the first HTES unit 610 is heated and pressurized further by energy received from the PV farm 601 through electric line 611. High temperature, high pressure air exiting the first HTES unit 610 is transmitted through fluid line 612 to a first turbine 650. The first turbine 650 is configured to drive the first and second compressors 620, 630 through shaft 655. Persons of skill in the art will appreciate that the first and second compressors 620, 630, first turbine 650, and first HTES unit 610 operate in a Brayton cycle wherein energy to the Brayton cycle is provided from the PV farm 601.

The first turbine 650 exhaust flows through fluid line 651 is supplemented by flow from fluid line 653 in junction 652, and the combined air flow is directed through and further heated in a second recuperator 660, and continues into the second HTES unit 615, where the combined air flow is heated to a very high temperature, producing a high pressure. The flow exits the second HTES unit 615 through fluid line 616 to a second turbine, power turbine 670 which is operatively connected to drive a first generator 672. The generator 672 is configured to transmit electrical energy to the building 602 through electric line 614.

The power turbine 670 exhaust flows through fluid line 671 into the second recuperator 660 wherein energy from the power turbine 670 exhaust preheats the air flow into the second HTES unit 615. The turbine exhaust flow continues from the second recuperator 660 to junction 661. A portion of the exhaust flow is directed through the fluid line 641 and then through the first recuperator 640, as discussed above, wherein energy from the power turbine 670 exhaust preheats the air flow into the first HTES unit 610. The flow continues through fluid line 642 to a first low-energy heat exchanger 685 before being expelled 686. The balance of the power turbine exhaust flows from junction 661 through fluid line 662 into a third recuperator 680. The air flow exits the third recuperator 680 through fluid line 643 and through a second low-energy heat exchanger 687 before being expelled 686.

A portion of the hot air flow 621 from the first compressor 620 flows from the junction 622 through fluid line 691 into a hot water heat exchanger 690. The flow exits the hot water heat exchanger 690 through fluid line 692 and is expanded in a third turbine 700, which is configured to drive a second electrical generator 710. Electrical energy from the second generator 710 is transmitted to the building 602 through electric line 711. The expanded air exiting the third turbine 700 is directed through fluid line 702 into a cold water heat exchanger 720.

A cold water loop 730 comprises a flow of relatively hot water through water line 731 from the building 602 through the cold water heat exchanger 720, thereby cooling the water from the low temperature expanded air exiting the third turbine 700, and returning the relatively cold water to the building 602 through water line 732.

A heated water loop 740 comprises a flow of relatively cold water from the building 602 through water line 741 through a junction 742. A controllable portion of the flow continues from the junction 742 through the first low-energy heat exchanger 685 and is heated therein with flow from the first recuperator 640, and then through water line 744 and through the second low-energy heat exchanger 687, thereby heating the water with flow from the third recuperator 680. The flow continues through water line 745 to junction 746 and the heated water is returned to the building 602 through line 749. A portion of the flow from junction 742 continues through water line 747 to the hot water heat exchanger 690, where it is heated by a portion of the compressed air from the first compressor 620. The water flow exits the hot water heat exchanger 690 through water line 748 and returns to junction 746, where it is returned to the building 602 at 749.

The disclosed system provides improved system efficiency in the use of available energy to the building. It will be appreciated, for example, that the incorporation of the cold water heat exchanger improves the efficiency of the system by using the low quality waste heat from the building. Other energy advantages will be appreciated by persons of skill in the art.

Figure 7:
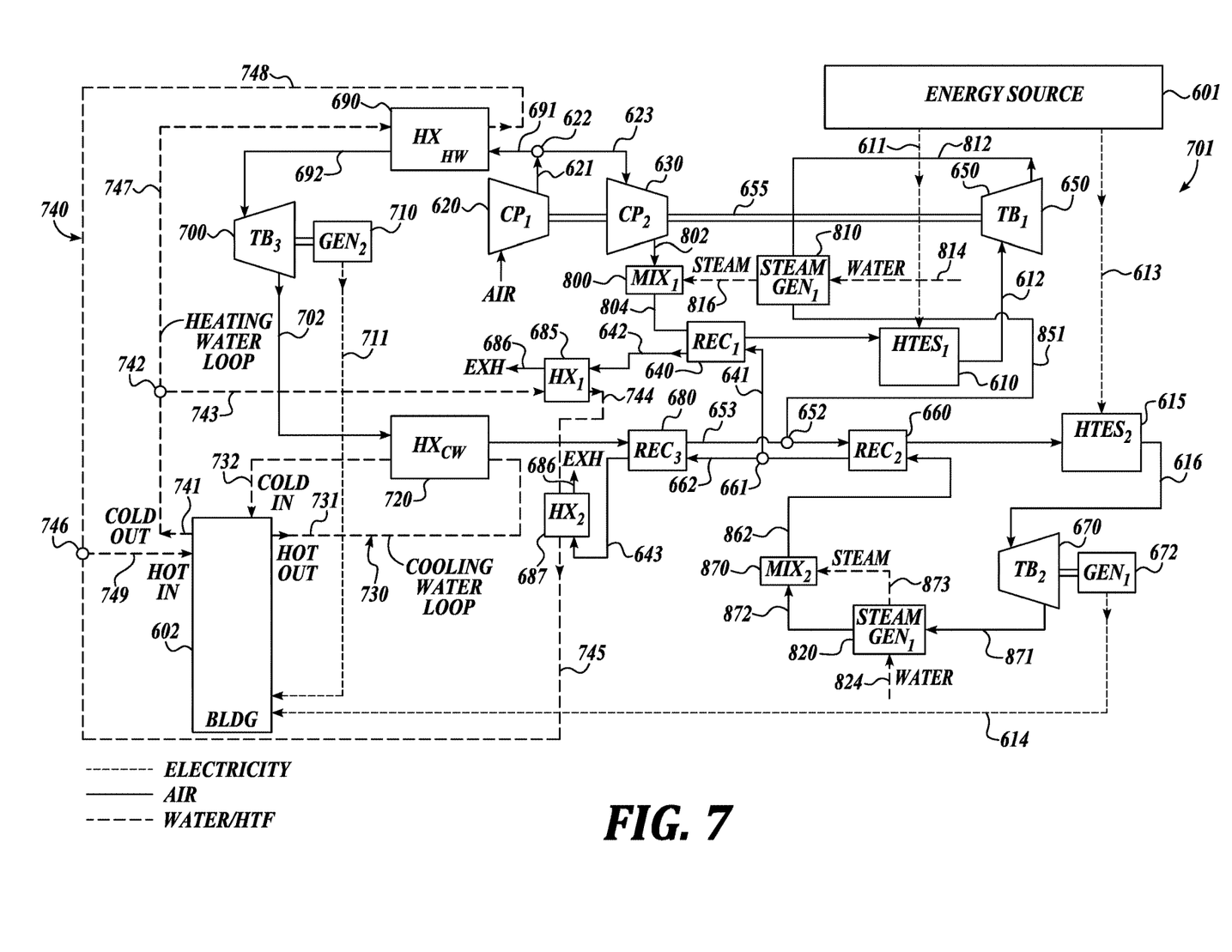
FIG. 7 shows an LCHESS system similar to the system shown in FIG. 6, and further including humidification of the heat transfer fluid.

FIG. 7 illustrates another embodiment of an S-CCHP system 701 similar to the system shown in FIG. 6. In this embodiment a S-CCHP system 701 includes one or more subsystems to generate a humid gas, for example humid air, for use as the heat transfer fluid. It will be appreciated by persons of skill in the art that humidifying the heat transfer fluid will increase the heat transfer efficiency to and from the heat transfer fluid. The increased heat transfer efficiency reduces the required heat transfer areas for a given energy transfer in the heat transfer components, reducing construction costs and space requirements, and is particularly advantageous in systems such as those described above, that use high temperature thermal energy storage material as a primary thermal energy source.

The S-CCHP system 701 is similar to the system 600 shown in FIG. 6, and for clarity a description of many of the common elements and features discussed above will not be repeated. It will also be appreciated by persons of skill in the art that other systems disclosed herein may be modified to include a humidification system similar to the system shown in FIG. 7.

In this embodiment the expanded gas from the first turbine 650 is directed to the first steam generator 810 through line 812. The turbine gas flow continues through line 851 to the second recuperator 660 through junction 652. A flow of water 814 is metered to the first steam generator 810 wherein the water is heated to steam 816, which is directed to a mixer 800. The mixer 800 also receives the compressed gas flow from the second compressor 630 through line 802, such that the compressed gas flow is humidified. The humidified air is directed to the first recuperator 640 through line 804 and thence to the first HTES unit 610.

Additionally or optionally, as also shown in FIG. 7, a humidification loop is provided using expanded gas flow from the power turbine 670. In particular, the hot and expanded gas from the power generator 672 is directed to a second steam generator 820 through line 871. Water 824 is metered to the second steam generator 820 where it is heated to a steam 873, and directed to a second mixer 870 through line 872, humidifying the expanded gas outflow from the second steam generator 820. The humidified fluid flows through line 862 to the second recuperator 660, and thence to the third recuperator 680.

The utilization of HTES instead of boilers in steam power generation cycles or combustors in gas power generation cycles has many advantages over both. For boilers, the energy required to boil water is tremendous and is costly in most cases. Therefore, organic power cycles have been utilized even though they pose significant environmental concerns. On the other hand, combustors usually utilize hydrocarbons to generate the required heat for gases before entering the turbine. Beyond the environmental concerns, gases usually are characterized by their weak heat transfer properties, therefore, requiring larger heat transfer surface areas.

While illustrative embodiments have been illustrated and described, it will be appreciated that various changes can be made therein without departing from the spirit and scope of the invention.

The embodiments of the invention in which an exclusive property or privilege is claimed are defined as follows:

1. An energy storage-combined cooling, heating and power (S-CCHP) system configured to receive energy from a source of energy and to provide heated fluid, cooled fluid, and electricity to a building, the S-CCHP system comprising:
a first high temperature energy storage (HTES) unit defining a heat transfer flow path and a second HTES unit defining a heat transfer flow path, wherein the first and second HTES units are each configured to receive energy from the source of energy, to store the received energy as thermal energy, and to transfer the stored thermal energy to air flowing through the corresponding heat transfer flow path;
a first air compressor connected to a second air compressor, and a turbine connected to drive the first and second air compressors, wherein the first air compressor is configured to generate a stream of compressed air to an outlet;
a flow junction configured to receive the stream of compressed air and to direct a first portion of the stream to a hot fluid heat exchanger and a second portion of the stream to the second air compressor, wherein the second air compressor is configured to further compress the second portion of the stream;
a first recuperator configured to receive the second portion of the stream from the second air compressor and to direct the second portion of the stream to the first HTES unit heat transfer flow path wherein an outlet of the first HTES unit heat transfer flow path is fluidly connected to the turbine and further wherein an outlet of the turbine is fluidly connected to a second recuperator that is configured to direct the second portion of the stream to the second HTES unit heat transfer flow path;
a first power turbine configured to receive the second portion of the stream from the second HTES unit heat transfer flow path, an outlet of the first power turbine fluidly connected to the second recuperator, wherein the first power turbine is drivably connected to a first generator that is configured to provide electrical energy to the building;
a flow conduit from the second recuperator configured to direct a first part of the second portion of the stream to the first recuperator and a second part of the second portion of the stream to a third recuperator;
a second power turbine configured to receive the first portion of the stream from the hot fluid heat exchanger, wherein the second power turbine is drivably connected to a second power generator that is configured to provide electrical energy to the building;
a cold fluid heat exchanger configured to receive the first portion of the stream from the second power turbine, wherein the third recuperator is configured to receive the first portion of the stream from the cold fluid heat exchanger and the second recuperator is configured to receive the first portion of the stream from the third recuperator;
a first fluid flow path configured to cycle a first heat transfer fluid from the building, through the cold fluid heat exchanger, and back to the building; and
a second fluid flow path configured to cycle a second heat transfer fluid from the building, through the hot fluid heat exchanger, and back to the building.

2. The S-CCHP system of claim 1, wherein the source of energy comprises an intermittent source of electric energy.

3. The S-CCHP system of claim 1, wherein the source of energy comprises one of a photovoltaic farm and a solar-thermal farm.

4. The S-CCHP system of claim 1, wherein the first HTES unit comprises a block of high-temperature, high-heat capacity material comprising a material having a specific heat capacity greater that 800 J/g° C. that retains its strength at temperatures of at least 1,000° C.

5. The S-CCHP system of claim 1, wherein the first HTES unit comprises a block of at least one of a refractory material, a high-temperature cement, and a ceramic composite.

6. The S-CCHP system of claim 1, wherein the first HTES unit comprises a block of a ceramic or refractory material having a plurality of cartridge heaters disposed in the block of material, and a flow path extending through the block of material.

7. The S-CCHP system of claim 1, wherein the first HTES unit comprises at least one block of material having a plurality of air channels therethrough with an inlet manifold at an inlet to the plurality of channels and an outlet manifold at an outlet to the plurality of channels.

8. The S-CCHP system of claim 7, wherein the at least one block of material comprises a plurality of blocks of material aligned in series wherein the inlet manifold engages a first one of the plurality of blocks of material and the outlet manifold engages a last one of the plurality of blocks of material.

9. The S-CCHP system of claim 8, wherein the blocks of material are spaced apart defining a space between adjacent blocks.

10. The S-CCHP system of claim 1, further comprising a first low-energy heat exchanger fluidly connected to the first recuperator and further comprising a third fluid flow path configured to cycle the second heat transfter fluid from the building, through the first low-energy heat exchanger, and back to the building.

11. The S-CCHP system of claim 1, wherein the first and second heat transfer fluids comprise water.

12. The S-CCHP system of claim 1, wherein the second portion of the stream from the second air compressor is humidified prior to being received by the first recuperator.

13. The S-CCHP system of claim 12, wherein the first power turbine is fluidly connected to the second recuperator through a humidifier, such that the second portion of the stream is humidified prior to flowing to the second recuperator.

14. A method of providing a heated fluid, a cooled fluid, and electricity to a building comprising:
    receiving energy from an energy source, and storing the received energy in a first high temperature energy storage (HTES) unit and in a second HTES unit;
    generating a first air stream comprising a compressively heated air stream and a second air stream comprising a turbine exhaust stream in a Brayton cycle using energy from the first HTES unit and a first compressor, a second compressor, and a turbine;
    directing the first air stream sequentially:
    (i) through a hot fluid heat exchanger; then
    (ii) through a first power turbine configured to drive a first generator; then
    (iii) through a cold fluid heat exchanger, then
    (iv) through the second HTES unit,
    wherein the first generator is configured to provide electricity to the building;
    directing the second air stream through the second HTES unit, wherein the first and second air streams are heated in the second HTES unit;
    directing the heated first and second air streams to a second power turbine configured to drive a second generator, wherein the second generator is configured to provide electricity to the building;
    generating a cold fluid stream for the building by cycling a first heat transfer fluid from the building, through the cold fluid heat exchanger, and back to the building; and
    generating a hot fluid stream for the building by cycling a second heat transfer fluid from the building, through the hot fluid heat exchanger, and back to the building.

15. The method of claim 14, wherein the energy source is an intermittent energy source.

16. The method of claim 15, wherein the intermittent energy source comprises one of a photovoltaic farm and a solar-thermal farm.

17. The method of claim 14, wherein the first HTES unit comprises a block of high-temperature, high-heat capacity material comprising a material having a specific heat capacity greater than 800 J/g° C. at 25° C. that retains its strength at temperatures of at least 1,000° C.

18. The method of claim 14, wherein the first HTES unit comprises a block of at least one of a refractory material, a high-temperature cement, and a ceramic composite.

19. The method of claim 14, wherein the first HTES unit comprises a block of a ceramic or refractory material having a plurality of cartridge heaters disposed in the block of material, and a flow path extending through the block of material.

20. The method of claim 14, wherein the first HTES unit comprises at least one block of material having a plurality of air channels therethrough with an inlet manifold at an inlet to the plurality of channels and an outlet manifold at an outlet to the plurality of channels.

* * * * *